US008018206B2

(12) United States Patent
Weigel

(10) Patent No.: US 8,018,206 B2
(45) Date of Patent: Sep. 13, 2011

(54) EXCITATION DEVICE FOR AN ELECTRIC MACHINE

(75) Inventor: Jan Weigel, Großenbuch (DE)

(73) Assignee: Siemens Aktiengesellschaft, Munich (DE)

( * ) Notice: Subject to any disclaimer, the term of this patent is extended or adjusted under 35 U.S.C. 154(b) by 294 days.

(21) Appl. No.: 11/992,846

(22) PCT Filed: Sep. 11, 2006

(86) PCT No.: PCT/EP2006/066214
§ 371 (c)(1),
(2), (4) Date: Mar. 31, 2008

(87) PCT Pub. No.: WO2007/039410
PCT Pub. Date: Apr. 12, 2007

(65) Prior Publication Data
US 2009/0153106 A1    Jun. 18, 2009

(30) Foreign Application Priority Data

Sep. 30, 2005    (DE) .......................... 10 2005 047 551

(51) Int. Cl.
*H02P 9/10* (2006.01)
*H02P 9/14* (2006.01)
*G05D 1/02* (2006.01)
*H04Q 9/00* (2006.01)
(52) U.S. Cl. .......................................... 322/59; 318/16
(58) Field of Classification Search .................... 322/59; 318/16
See application file for complete search history.

(56) References Cited

U.S. PATENT DOCUMENTS

| | | | | | |
|---|---|---|---|---|---|
| 3,784,888 | A | * | 1/1974 | Geiersbach et al. | 318/400.01 |
| 3,931,553 | A | * | 1/1976 | Stich et al. | 318/400.01 |
| 3,956,679 | A | * | 5/1976 | Chalmers | 318/700 |
| 3,991,351 | A | * | 11/1976 | Chalmers | 318/711 |
| 4,093,869 | A | * | 6/1978 | Hoffmann et al. | 290/31 |
| 4,549,130 | A | * | 10/1985 | Dobberstein | 323/308 |
| 4,949,362 | A | * | 8/1990 | Gaubatz | 376/259 |

(Continued)

FOREIGN PATENT DOCUMENTS

DE    1 438 628    4/1969
(Continued)

OTHER PUBLICATIONS

Albert Esser; "Berührungslose, Kombinierte Energie-und Infomationsübertragung für Bewegliche Systeme"; Von der Fakultät für Elektrotechnik-Fachbereich 6—der Rheinisch-Westfälischen Technishen Hochschule Aachen zur Erlangung des akademischen Grades eines Doktor-Ingenieurs genehmigte Dissertation; Feb. 1992; pp. 1-127.

(Continued)

*Primary Examiner* — T. C. Patel
*Assistant Examiner* — Pedro J Cuevas
(74) *Attorney, Agent, or Firm* — Staas & Halsey LLP

(57) ABSTRACT

With an aim of minimizing excitation losses in electric machines having electrically excited and displaceable secondary parts, bi-directional inductive transmission of energy is carried out by a rotating inductive transmission device. An associated electronic system for the bi-directional transmission of power and/or energy, is provided. Advantageously, super-conductive inductance is present wherein the flow is introduced. It is possible to excite by supplying energy to the stator and to also de-excite by removing energy without converting the power into heat on the rotor by applying a bipolar tension.

9 Claims, 1 Drawing Sheet

U.S. PATENT DOCUMENTS

| | | | |
|---|---|---|---|
| 6,288,551 B1* | 9/2001 | Zabler et al. | 324/502 |
| 6,301,128 B1* | 10/2001 | Jang et al. | 363/17 |
| 6,362,588 B1 | 3/2002 | Umans et al. | 318/521 |
| 6,396,247 B1* | 5/2002 | Gibbs et al. | 322/28 |
| 6,462,432 B1* | 10/2002 | Seelig et al. | 307/33 |
| 6,934,167 B2* | 8/2005 | Jang et al. | 363/21.02 |
| 7,579,715 B2* | 8/2009 | Seelig et al. | 307/75 |
| 7,687,928 B2* | 3/2010 | Taneja et al. | 290/36 R |
| 2005/0218741 A1* | 10/2005 | Wnorowski et al. | 310/179 |
| 2006/0113968 A1* | 6/2006 | Flockerzi | 323/201 |
| 2006/0267523 A1* | 11/2006 | Seelig et al. | 318/16 |
| 2007/0120539 A1* | 5/2007 | Bray et al. | 322/59 |
| 2009/0153106 A1* | 6/2009 | Weigel | 322/59 |
| 2010/0066299 A1* | 3/2010 | Izumi et al. | 318/718 |
| 2010/0071889 A1* | 3/2010 | Radl | 165/286 |
| 2010/0134074 A1* | 6/2010 | Crane | 322/79 |
| 2010/0147605 A1* | 6/2010 | Klatt | 180/65.1 |
| 2010/0171381 A1* | 7/2010 | Ling | 310/113 |
| 2010/0219786 A1* | 9/2010 | Eckerle | 318/716 |

FOREIGN PATENT DOCUMENTS

| | | |
|---|---|---|
| DE | 1 488 978 | 4/1969 |
| DE | 1 563 783 | 4/1970 |
| DE | 41 33 001 A1 | 4/1992 |
| DE | 102 37 779 A1 | 3/2004 |
| DE | 600 09 349 T2 | 2/2005 |
| EP | 1 247 324 B1 | 3/2004 |

OTHER PUBLICATIONS

International Search Report for Application No. PCT/EP2006/066214; mailed Dec. 12, 2006.

German Office Action for Application No. 10 2005 047 551.5-32; dated Dec. 21, 2006.

Communication issued by the European Patent Office on Feb. 28, 2011 in the related European patent application.

* cited by examiner

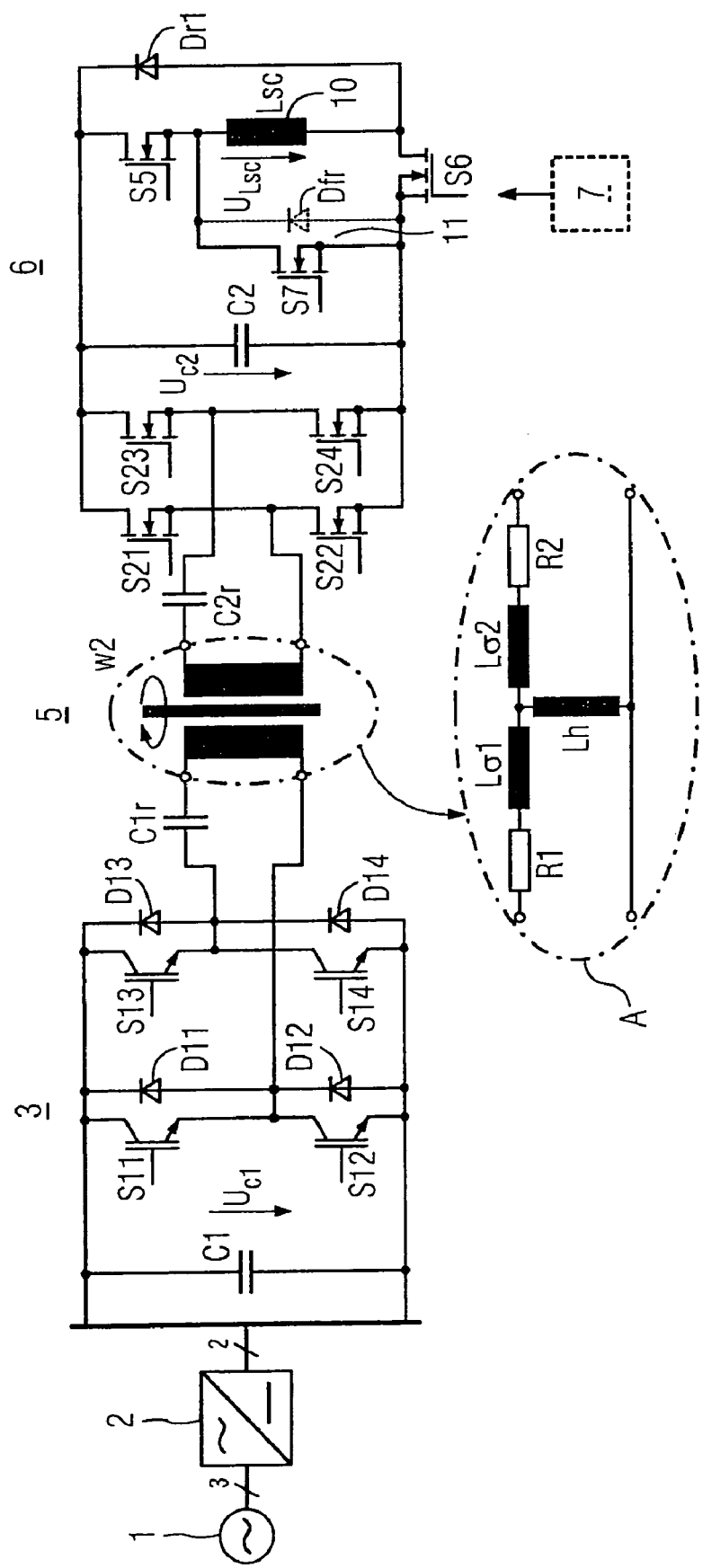

EXCITATION DEVICE FOR AN ELECTRIC MACHINE

CROSS REFERENCE TO RELATED APPLICATIONS

This application is based on and hereby claims priority to German Application No. 10 2005 047 551.5 filed on Sep. 30, 2005, the contents of which are hereby incorporated by reference.

BACKGROUND

Described below is an excitation device for an electric machine. In particular, the electric machine is a synchronous machine, which preferably, but not exclusively, uses a superconducting inductance as the field winding.

In electric machines with an electrically excited and moved secondary part (rotor), such as in particular in the case of synchronous machines (SM), the excitation losses can advantageously be reduced to a minimum by implementing the exciter winding as a high-temperature superconducting (HTS) winding. For this purpose, however, the cooling of the superconductor to a temperature range of below 80K, i.e. at least the temperature of liquid nitrogen, is necessary.

In the case of a design with superconductors, any input of heat via mechanical contacts should be avoided as far as possible. Mechanical contacts, such as sliprings or the like, are involved as a result of the maintenance required and moreover are susceptible to wear. For this reason, the excitation power, the monitoring and regulation information is advantageously transmitted in contactless fashion, i.e. inductively, to the rotor. During operation of the machine, it is necessary to convert the de-excitation energy into heat when the field windings in the machine are demagnetized.

Known excitation devices for a superconducting winding typically include a contactless energy transmission path, a contactless control or regulating signal transmission path to a stationary control and regulating unit, and an actuator for impressing a voltage and a freewheeling circuit. In this case, the transformer in particular functions inductively.

EP 1 247 324 B1 proposes a unidirectional inductive energy transmission, a "rotating transformer" including two pot-type cores with ring windings and axial flux guidance being provided as inductive operating means. In this case, the pot-type cores can move toward one another about the common axis.

Inductively functioning operating means are described in detail in the dissertation: Albert Esser: "Berührungslose, kombinierte Energie- und Informationsübertragung für bewegliche Systeme" [Contactless, combined energy and information transmission for mobile systems] ISBN 3-86073-046-0; ISEA, RWTH Aachen 1992. The statements in the dissertation are aimed at contactless bidirectional energy and data transmission in robot joints.

DE 41 33 001 A1 has furthermore disclosed "photoelectric transmission" for the transmission of both energy and data. While the energy transmission has a deficient power density, data can be transmitted in a manner which is very insensitive to faults and free of potential. Such systems are commercially available. Such unidirectional energy transmission for exciting a superconducting winding needs a passive resistor on the cooled rotor for de-excitation, which resistor converts the excitation energy into heat, which then needs to be dissipated. Both the input of heat and the passively and exponentially decaying excitation are in this case undesirable.

Against the background of the related art, an improved excitation device for a winding which can be used in electric machines.

SUMMARY

Described below is a synchronous machine with a superconducting field winding; however, it is also suitable for exciting non-superconducting windings.

Bidirectional energy transmission via a rotating inductive transformer is implemented. The inductive transformer in this case advantageously includes pot-type cores and a suitable voltage actuator on the rotor.

With the excitation device as described below, in particular a superconducting inductance can be fed directly. Advantageously, in this case a bipolar voltage can be impressed on the superconducting inductance. If this voltage has a constant absolute value, the superconducting inductance can be excited or de-excited linearly in corresponding fashion.

In this context, feeding of the control electronics and possibly other electrical devices is temporarily possible from the superconducting inductance for the case of feedback with simultaneous system voltage failure. A separate uninterrupted power supply (UPS) is therefore advantageously not necessary. Furthermore, an undesirable input of heat in the cooled system during demagnetization can be avoided by the feedback of the excitation energy.

The rotating transformer does not necessarily need to be operated in star-connected fashion as a result of a reduced capacity utilization. Transmission at mid-frequency, under certain circumstances if possible at resonant frequency, is recommended for a good power density of the inductive transformer, with the result that the components are small.

Both active excitation and de-excitation of in particular superconducting field coils for an electric synchronous machine are made possible. In this case, there is not an increased input of heat into the cooled system. In addition, in the event of a system voltage failure a UPS function results.

BRIEF DESCRIPTION OF THE DRAWINGS

These and other aspects and advantages will become more apparent and more readily appreciated from the following description of an exemplary embodiment, taken in conjunction with the accompanying drawing.

The single FIGURE is a circuit diagram of a device for the bidirectional excitation and de-excitation especially of a superconducting coil.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

In the FIGURE, the circuit in detail includes a system terminal 1 as the voltage source, a downstream converter 2 including a rectifier with a connected inverter 3 and associated electronics. Furthermore, an inductive transformer 5 is provided whose equivalent circuit diagram as a contactless transformer is illustrated in the enlarged illustration A.

On the secondary side, an excitation circuit 6 with voltage input or setting for an inductance is connected to the transformer 5. The inductance is formed from a coil made of superconducting material, in particular of high-temperature superconducting (HTS) material, which has a comparatively high critical temperature.

In the FIGURE, the superconducting coil with the inductance value $L_{SC}$ is overall denoted by 10. A freewheeling circuit 11 is connected in parallel with the superconducting coil 10.

The freewheeling circuit 11 is arranged in the direct vicinity of the superconducting winding 11 and, in accordance with specifications, has a low resistance value. An external actuator 7 for providing a bipolar voltage on the superconducting winding 10 in the event of a unipolar field current is essential for the dynamic operation of the excitation field. If, during the demagnetization, a power failure occurs on the primary side of an excitation device, the HTS winding 10 needs to be connected to the freewheeling circuit 11 since the excitation power then does not need to be dissipated to the primary side. Otherwise, the electrical power on the stator of the machine would need to be converted into heat.

The specific design of the excitation device thus described is provided, as shown in the FIGURE, by the combination of the respective components, which are given standard designations and to which specific reference is made. Thus, a unit for bidirectional power and energy transmission and an actuator for bipolar voltage impressing on the superconducting inductance of the coil 10 are defined.

A three-phase steady-state system terminal makes available a DC voltage on the intermediate circuit capacitance C1 by a standard rectifier. Predetermining a bidirectional power flow requires either a self-commutated voltage-impressing rectifier or a simple line-commutated diode bridge with a braking chopper for converting the energy which can be fed back from the superconducting inductance. At first, the power flow from the system terminal to the superconducting inductance is illustrated (from left to right).

The inverter 3 and the transmission path are voltage-impressing converters. The inverter (for example with the IGBTs $S1x$, $D1x$) converts the DC voltage into a square-wave voltage with a mid-frequency $f_S$. The rectifier ($S2x$ in this case MOSFETs with intrinsic freewheeling diodes) functions on a DC voltage capacitor C2. The use of MOSFETs on the secondary side is preferably suitable in the case of a comparatively low voltage U2.

In the embodiment illustrated in FIG. 1, the following resonant capacitances $C1r$ and $C2r$ are present:

$$C1r = \frac{1}{4\pi^2 \cdot f_S^2 \cdot L_{\sigma 1}}; \quad (1)$$

$$C2r = \frac{1}{4\pi^2 \cdot f_S^2 \cdot L_{\sigma 2}} \cdot \left(\frac{w_2}{w_1}\right)^2 \quad (2)$$

A sinusoidal current in the AC intermediate circuit results, with the inductive voltage drops across the stray inductances $L\sigma_x$ being compensated for. The resonant capacitance can also only be applied on one side.

The voltage $$U_{C2} \approx U_{C1} \cdot \frac{w_2}{w_1}$$

across C2, with the IR drops across the transformer windings and on the power semiconductors, is not much less than the voltage $U_{C1}$ calculated using the transformation ratio on the secondary side. The losses occurring are also used for attenuating the system in the event of sudden load variations on the capacitance C2, however.

The selection of the capacitance C2 which is suitable in terms of the correct attenuation is explained in the dissertation cited at the outset. The respective rectifier is always passive, and the corresponding power switches (IGBTs or diodes) are correspondingly turned off by the sequence controller.

In the rectifier, the diodes conduct the current and are naturally commutated. The inverter switches the IGBTs on with zero current and hard off. However, then only the low delta-wave magnetization current needs to be commutated to the diodes.

With reverse power flow, the rectifiers and inverters swap roles. The superordinate steady-state sequence controller controls the excitation or de-excitation or the freewheeling of the field current and the rotating voltage actuator in order to control $U_{LSC}$.

S5-S7 with the diodes Dr1 and the body diode Dfr of S7 function as the voltage actuator. If S5 and S6 are in the switched-on state and S7 is in the switched-off state, the HTS winding is excited by the voltage $-U_{C2}$. If S5 is switched off, the diode Dfr takes on the free-wheeling current. Its forward voltage is reduced by the MOSFET S7 being switched on in the third quadrant of its control characteristic and therefore substantially taking on the freewheeling current. If S6 is switched off, the voltage $-U_{C2}$ is present at $L_{SC}$. The HTS winding 10 is therefore de-excited.

It is essential during the excitation and the de-excitation of the HTS inductance that the contactless energy transmission equally allows the corresponding power flow, which is ensured by the sequence controller with the power electronics. If the field current has reached a certain desired value, switching into the freewheeling circuit takes place until the value has fallen below a certain limit and recharging needs to take place again in the excitation state.

The arrangement described is particularly suitable for feeding a large rotating HTS inductance, whose magnetization current is controlled in steady-state fashion by low regulation/control dynamics. In particular, the sequence controller has knowledge on the direction of the power flow, with the result that no synchronization of the inverter and the rectifier is required as in the related art mentioned at the outset. The respective rectifier is always passive, and the corresponding power switches (IGBTs or diodes) are correspondingly turned off by the sequence controller.

If the system voltage fails during the de-excitation process, it is necessary to transfer to the freewheeling circuit since the power cannot be output without braking choppers and therefore the intermediate circuit voltage on the system-side converter can assume hazardously high values. Correspondingly, the sequence controller in the event of system failure must not fail. Recharging of the voltage $U_{C1}$ from the HTS winding which may be necessary guarantees a sufficient supply voltage. Depending on the energy content of the HTS winding, other components can also be supplied from $U_{C1}$ in order to disconnect them in controlled fashion in the event of a system failure (UPS).

Optical, inductive or capacitive systems can be used for the contactless data transmission of the field current measured values and the control information of the secondary converters. A particular advantage of the described circuit is the fact that the excitation and de-excitation can take place in controlled fashion in the circuits described. A separate energy source is therefore not required for de-excitation purposes.

The system also includes permanent or removable storage, such as magnetic and optical discs, RAM, ROM, etc. on which the process and data structures of the present invention can be stored and distributed. The processes can also be distributed via, for example, down-loading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. An excitation device for electric machines comprising:
   a stator;
   a rotor with a field winding, the field winding being a superconducting inductance;
   an inductive transformer transmitting energy inductively to the field winding; and
   associated power electronics providing bidirectional transmission of at least one of power and energy.

2. The excitation device as claimed in claim 1, wherein said inductive transformer comprises two pot-type cores and a voltage actuator for the winding on the rotor.

3. The excitation device as claimed in claim 2, wherein the field winding on said rotor is a superconducting inductance.

4. The excitation device as claimed in claim 3, wherein the superconducting inductance includes a winding made of high-temperature superconducting material.

5. The excitation device as claimed in claim 3, wherein the voltage actuator feeds the superconducting inductance directly.

6. The excitation device as claimed in claim 3, wherein a bipolar voltage can be impressed on the superconducting inductance.

7. The excitation device as claimed in claim 3, wherein the power electronics are coupled to the superconducting inductance, receiving feedback in case of simultaneous system voltage failure.

8. The excitation device as claimed in claim 7, wherein the excitation device is connected to other electrical devices fed by the superconducting inductance.

9. The excitation device as claimed in claim 1, wherein electric energy is transmitted inductively at mid-frequency with resonant tuning for a desired power density of the inductive transformer.

* * * * *